United States Patent
Schmisseur

(10) Patent No.: US 7,206,899 B2
(45) Date of Patent: Apr. 17, 2007

(54) METHOD, SYSTEM, AND PROGRAM FOR MANAGING DATA TRANSFER AND CONSTRUCTION

(75) Inventor: Mark A. Schmisseur, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 486 days.

(21) Appl. No.: 10/747,932

(22) Filed: Dec. 29, 2003

(65) Prior Publication Data

US 2005/0144382 A1     Jun. 30, 2005

(51) Int. Cl.
G06F 13/00     (2006.01)
(52) U.S. Cl. .................. 711/114; 711/155; 711/156
(58) Field of Classification Search .............. 711/114, 711/155, 156
See application file for complete search history.

(56) References Cited

U.S. PATENT DOCUMENTS

| 5,636,359 | A |   | 6/1997  | Beardsley et al. |        |
|-----------|---|---|---------|------------------|--------|
| 6,151,641 | A | * | 11/2000 | Herbert          | 710/22 |
| 6,247,157 | B1|   | 6/2001  | Edirisooriya     | 714/767|
| 6,353,895 | B1|   | 3/2002  | Stephenson       | 714/5  |
| 2005/0160307 | A1 |  | 7/2005 | Schmisseur      |        |

FOREIGN PATENT DOCUMENTS

WO     0131456     5/2001

OTHER PUBLICATIONS

Official Letter, Nov. 21, 2005, for Republic of China Patent Application No. 93139795.
Patterson, et al. "A Case for Redundant Arrays of Inexpensive Disks (RAID)," 1988 ACM 0-89791-268-3/88/0006/0109; pp. 109-116.
HP Technical Guide, "Mathematics behind RAID 5DP," Hewlett-Packard Company, 2001; 10 pp.
Intel IOP303 I/O Processor. Internet document http://developer.intel.com/design/iio/80303.htm; copyright 2003, 4 pp. (available prior to Dec. 29, 2003).
Intel IOP331 I/O Processor. Internet document http://developer.intel.com/design/iio/iop331.htm; copyright 2003, 4 pp.(available prior to Dec. 29, 2003).

(Continued)

*Primary Examiner*—Reba I. Elmore
(74) *Attorney, Agent, or Firm*—William K. Konrad; Konrad Raynes & Victor LLP

(57) ABSTRACT

Provided are a method, system, and program for constructing data including reconstructing data organized in a data organization type, such as a Redundant Array of Independent Disks (RAID) organization, for example, which permits data reconstruction In one embodiment, blocks of data are transferred from a stripe of data stored across storage units, such as disk drives in a RAID array, to a logic engine of a storage processor, bypassing the cache memory of the storage processor. A store queue performs a logic function, such as Exclusive-OR, on each block of data as it is transferred from the disk drives, to reconstruct a block of data from the stripe. The constructed block of data may be subsequently transferred to a disk drive of the RAID array to replace a lost block of data in the stripe of data across the RAID array or to replace an old block of parity data.

50 Claims, 11 Drawing Sheets

OTHER PUBLICATIONS

Intel IOP331I/O Processor Chipset. Internet document http://developer.intel.com/design/iio/docs/iop331.htm; copyright 2003, 1 p.(available prior to Dec. 29, 2003).

Intel 80333 I/O Processor, Developer's Manual. Intel Document No. 305432001US. Copyright Mar. 2005. Copyright & contents (pp. 1-40); Chapters 1 (pp. 41-48) and 6 (pp. 375-408. (subject matters of chapters 1 and 6 available prior to Dec. 29, 2003).

PCT International Search Report and Written Opinion, May 24, 2006, for International Application No. PCT/US2004/043041.

RAID Advisory Board, The RAIDbook, Sixth Edition, Feb. 1997, "Chapter 10: RAID and Cache", pp. 181-195.

Vilayannur, M., A. Sivasubramaniam, M. Kandemir, R. Thakur, and R. Ross, "Discretionary Caching for I/O on Clusters", Proceedings of the 3rd IEEE/ACM International Symposium on Cluster Computing and the Grid, May 2003, pp. 96-103.

Deyring, K. (Ed.), "Serial ATA: High Speed Serialized AT Attachment", Rev. 1.0, Aug. 29, 2001, 36 pp.

Elliot, R.C. (Ed.), "Information Technology—Serial Attached SCSI (SAS)", Working Draft American National Standard, T10/1562-D, Revision 5, Jul. 9, 2003, Ch. 1-7, 273 pp.

Elliot, R.C. (Ed.), "Information Technology—Serial Attached SCSI (SAS)", Working Draft American National Standard, T10/1562-D, Revision 5, Jul. 9, 2003, Ch3 8-Annex K, 191 pp.

Nelson, J. (Ed.), "Fibre Channel: Framing and Signaling (FC-FS)", Rev. 1.90, Apr. 9, 2003, Ch. 1-3, 64 pp.

PCI Special Interest Group, "PCI Local Bus Specification", Revision 2.3, Mar. 29, 2002, 123 pp.

PCT International Preliminary Report on Patentability (IPRP), Jul. 13, 2006, for International Application No. PCT/US2004/043041.

* cited by examiner

METHOD, SYSTEM, AND PROGRAM FOR MANAGING DATA TRANSFER AND CONSTRUCTION

BACKGROUND

1. Field

Embodiments relate to a method, system, and program for managing data in a system of data organization, such as a RAID system.

2. Description of the Related Art

Various techniques have been proposed for organizing data stored in data storage devices such as disk drives. One such data storage organization is referred to as Redundant Array of Independent (or Inexpensive) Disks or (RAID). In a RAID organization, two or more disk drives are employed in combination to improve fault tolerance or performance, or both. There are different types of RAID data storage organizations and these different types are often referred to as RAID "levels 0, 1, 2 . . . ."

In a RAID level 0 data organization, for example, the data of a user file is "striped", that is, blocks of user data are spread across multiple disks to improve performance. However, there is generally no redundancy provided for recovery of data should one of the drives fail in a RAID level 0 organization of data. A RAID level 3 organization of data is similar to RAID level 0 but one disk is typically reserved to store error correction data, often referred to as "parity data." This parity data may be used to reconstruct lost user data should one of the drives fail. In a RAID level 5 data organization, parity data is provided for each stripe of data across the array of disk drives and no particular disk drive is dedicated to storing the parity data. Instead, blocks of parity data for the stripes of user data are distributed throughout all the disks of the array, to further improve performance.

In one RAID-5 organization, there is one block of parity data for each stripe of data across the array of disk drives. Such an arrangement provides ready reconstruction of data should one drive fail. For example, if a stripe of data includes four blocks of data and one block of parity data, if one of the blocks of the stripe becomes lost due to drive failure, data corruption or other types of failures, the lost block can be reconstructed using the surviving four blocks of the stripe.

FIG. 1 illustrates one example of prior art logical operations which may be performed to rebuild lost data. If a stripe n of data has four blocks of data and one block of parity data, and data of one block from stripe n is lost, the lost data can be reconstructed using a sub-block of good data from the three good blocks of data and a sub-block of good parity data from the good parity block of stripe n. Thus, in the example of FIG. 1, an Exclusive-OR function is performed on a first sub-block 30 of good data from one good block of data from stripe n, and a second sub-block 32 of good data from a second good block of data from stripe n. The result of the Exclusive-OR logical operation can be Exclusive-OR'ed with another sub-block 33 of good data from a third good block of data from stripe n. The result of that Exclusive-OR logical operation can be Exclusive-OR'ed with a sub-block 34 of good parity data from the good parity block from stripe n, to reconstruct a sub-block 36 of data to replace the lost sub-block of data. If an entire block of data is lost from a stripe, the entire block can be reconstructed repeating the operations of FIG. 1 for each sub-block of the block.

FIG. 2 shows an example of a prior art logic engine 50 of a RAID storage processor for reconstructing lost data of RAID storage units in accordance with the logic functions of FIG. 1. The logic engine 50 has a store queue 52 which can perform an Exclusive-OR logical function on the contents of the store queue 52 as represented by an arrow 54, and the data being presented at its input as represented by an arrow 56. The Intel 80303 integrated circuit chip has a similar logic engine referred to as an Application Accelerator Unit (AAU).

Operations of reading data and processing the read data using the logic engine 50 in reconstructing data is represented in FIG. 3. Upon resetting (process block 60) the store queue 52, a block of good data may be read (process block 62) in a first read operation 63 (FIG. 2) from a stripe n of a disk drive 64a of a RAID array 66 to a local memory 68 of a storage processor or controller. Another block of good data may be read (process block 62) in a second read operation 70 from the stripe n of a disk drive 64b of the RAID array 66 to the local memory 68 of a storage processor or controller. A third block of good data may be read (process block 62) in a third read operation 72 from the stripe n of a disk drive 64c of the RAID array 66 to the local memory 68. A block of good parity data may be read (process block 62) in a fourth read operation 74 from the stripe n of a disk drive 64e of the RAID array 66 to the local memory 68.

Once all of the good blocks of data and parity data have been read (process block 80) from the stripe, a sub-block of the data read from the disk drive 64a may be read (process block 82) from the local memory 68 in a portion of a fifth read operation 84 and stored in the store queue 52. This data may be for example, the sub-block of data 30 of FIG. 1. Since the store queue 52 was previously reset, the data 30 which originated from the drive 64a may be stored in the store queue 52 by performing an Exclusive-OR function with the data 30 read from the local memory 68 and the reset contents of the store queue 52. The size of the read operations from the local memory 68 to the logic engine 50 will typically depend upon the capacity of the store queue 52. Thus, if, for example, the capacity of the store queue 52 is 1 K bytes, the read operation 84 will continue until the store queue 52 is filled with 1 K bytes of the data 30.

A sub-block of the next block of data from the stripe n, that is, a sub-block of the block of data read from the disk drive 64b may be read (process block 86) from the local memory 68 in a portion of sixth read operation 90. This data may be for example, the sub-block 32 of data of FIG. 1. The sub-block 32 of data from the block of data read from the drive 64b is Exclusive-OR'ed (process block 88) with the sub-block 30 of data previously stored in the store queue 52, and stored as an intermediate result in the store queue 52.

A sub-block 33 (FIG. 1) of the next block of data from the stripe n, that is, a sub-block of the block of data read from the disk drive 64c may be read (process block 86) from the local memory 68 in a portion of seventh read operation 92. The sub-block 33 of data from the block of data read from the drive 64c is Exclusive-ORed (process block 88) with the contents of the store queue 52, and stored as an intermediate result in the store queue 52.

A sub-block 34 (FIG. 1) of the parity data block of data from the stripe n, that is, the sub-block of the block of data read from the disk drive 64e may be read (process block 86) from the local memory 68 in a portion of an eighth read operation 94. The sub-block 34 of parity data from the parity block of read from the drive 64e is Exclusive-OR'ed (process block 88) with the contents of the store queue 52, and stored as an intermediate result in the store queue 52.

Once all of the corresponding sub-blocks of the good blocks of data and parity of the stripe n have been received and processed (process block 95), the intermediate result stored in the store queue 52 is the rebuilt sub-block 36 of stripe n which may be written (process block 96) to the local memory 68 in a portion of a write operation 96 to be written to the disk drive 64d in a subsequent write operation 97 to replace the lost sub-block.

The process of FIG. 3 may be repeated for each sub-block of the blocks of the stripe n until all the sub-blocks have been received (process block 98) and processed by the logic engine 50 wherein an entire block of the stripe n may be reconstructed, if needed. Moreover, if all of the data of the drive 64d, for example has been lost, the process may be repeated for each stripe of the array 66 of the disk drives until every block of the damaged disk drive 64d has been reconstructed. The process of constructing new parity data when updating old data with new data in a RAID type data organization is similar.

Notwithstanding, there is a continued need in the art to improve the performance of processors in data storage organization.

BRIEF DESCRIPTION OF THE DRAWINGS

Referring now to the drawings in which like reference numbers represent corresponding parts throughout.

DETAILED DESCRIPTION OF THE ILLUSTRATED EMBODIMENTS

In the following description, reference is made to the accompanying drawings which form a part hereof and which illustrate several embodimentss. It is understood that other embodiments may be utilized and structural and operational changes may be made.

Figure 1:
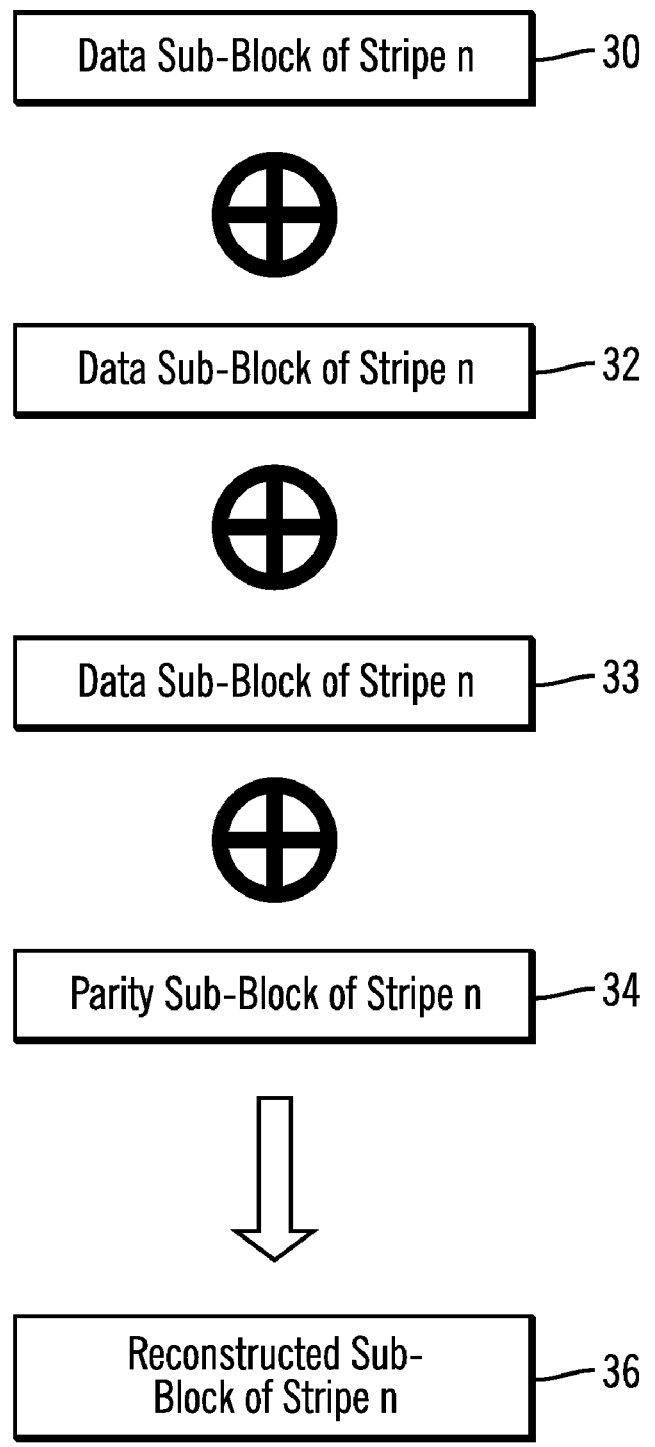
FIG. 1 illustrates a prior art reconstruction of RAID data.
Figure 2:
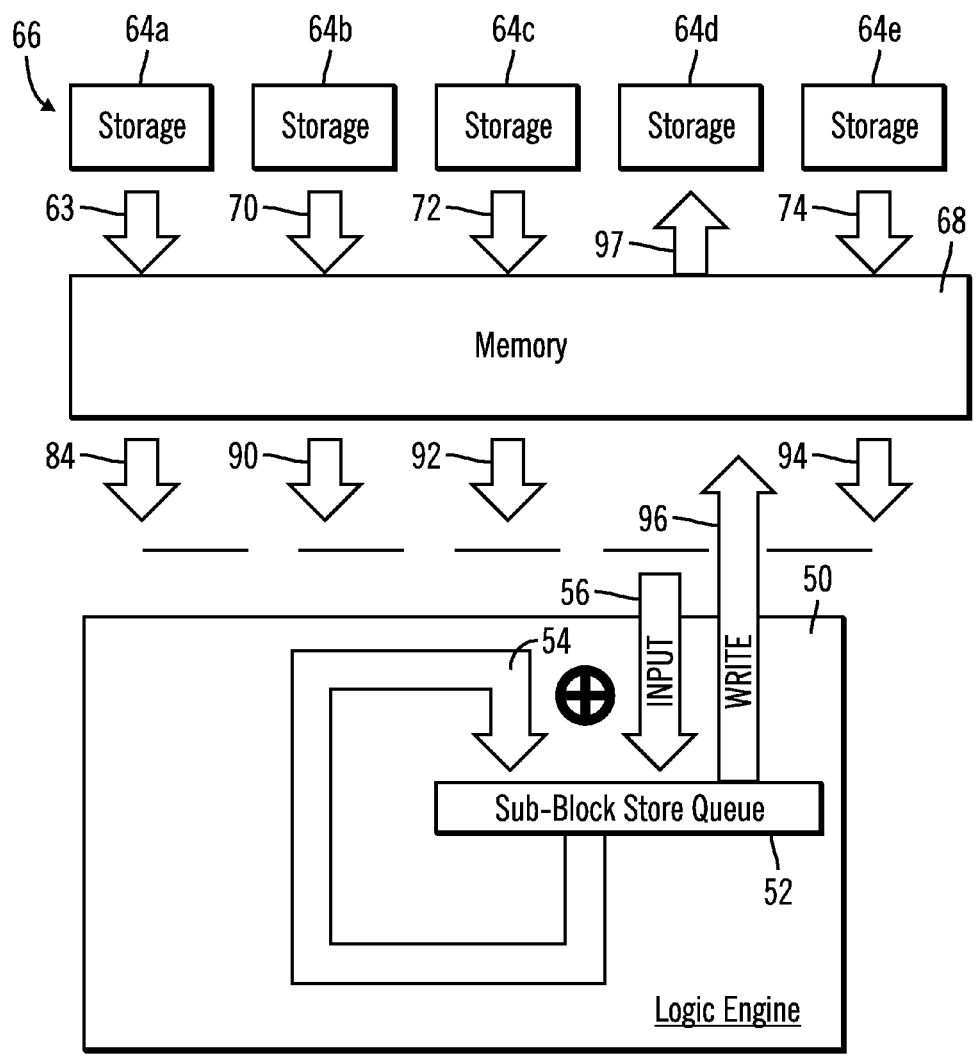
FIG. 2 illustrates a prior art logic engine for reconstruction of RAID data.
Figure 3:
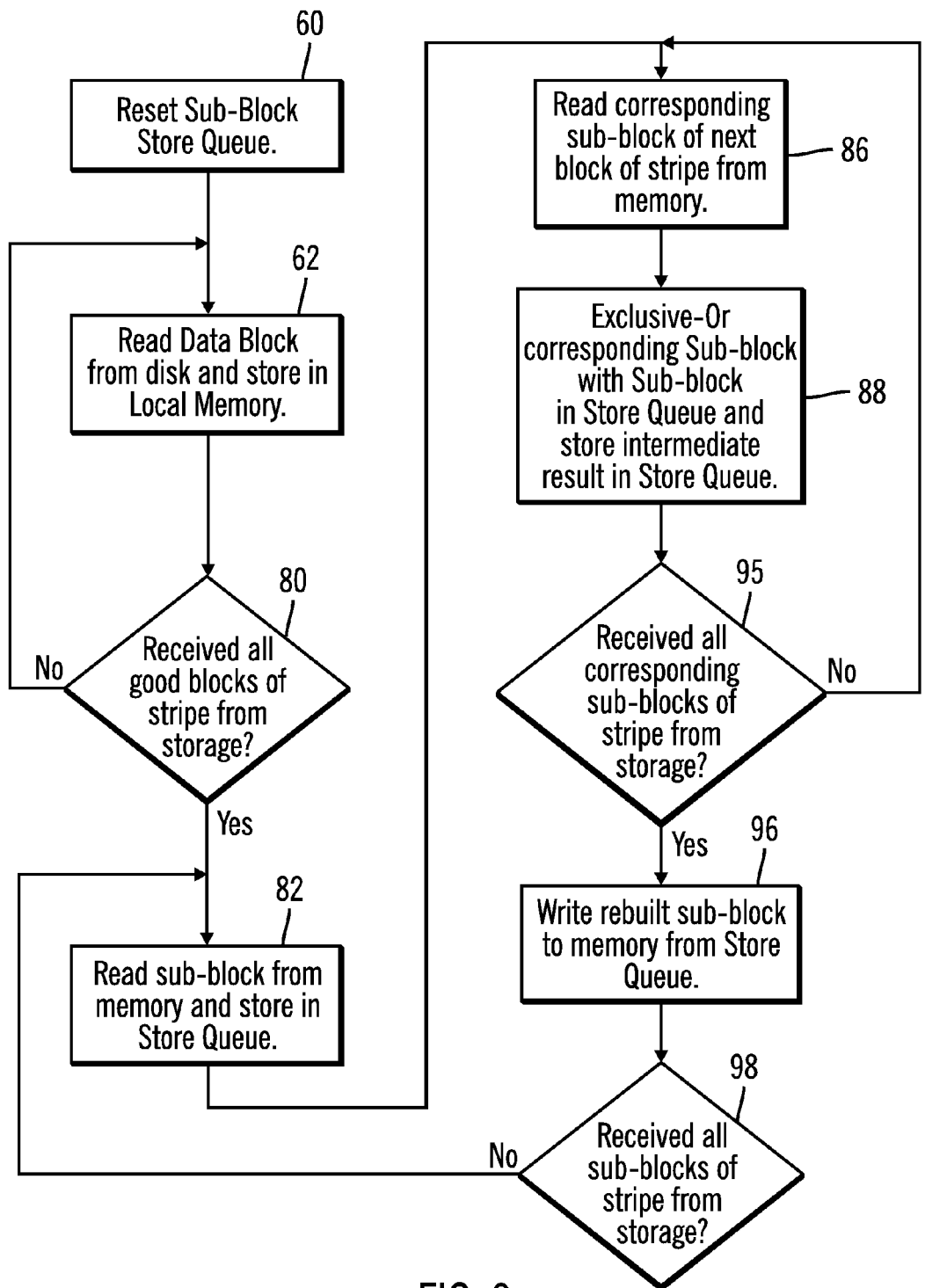
FIG. 3 illustrates prior art operations to reconstruct data using the prior art logic engine of FIG. 2.
Figure 4:
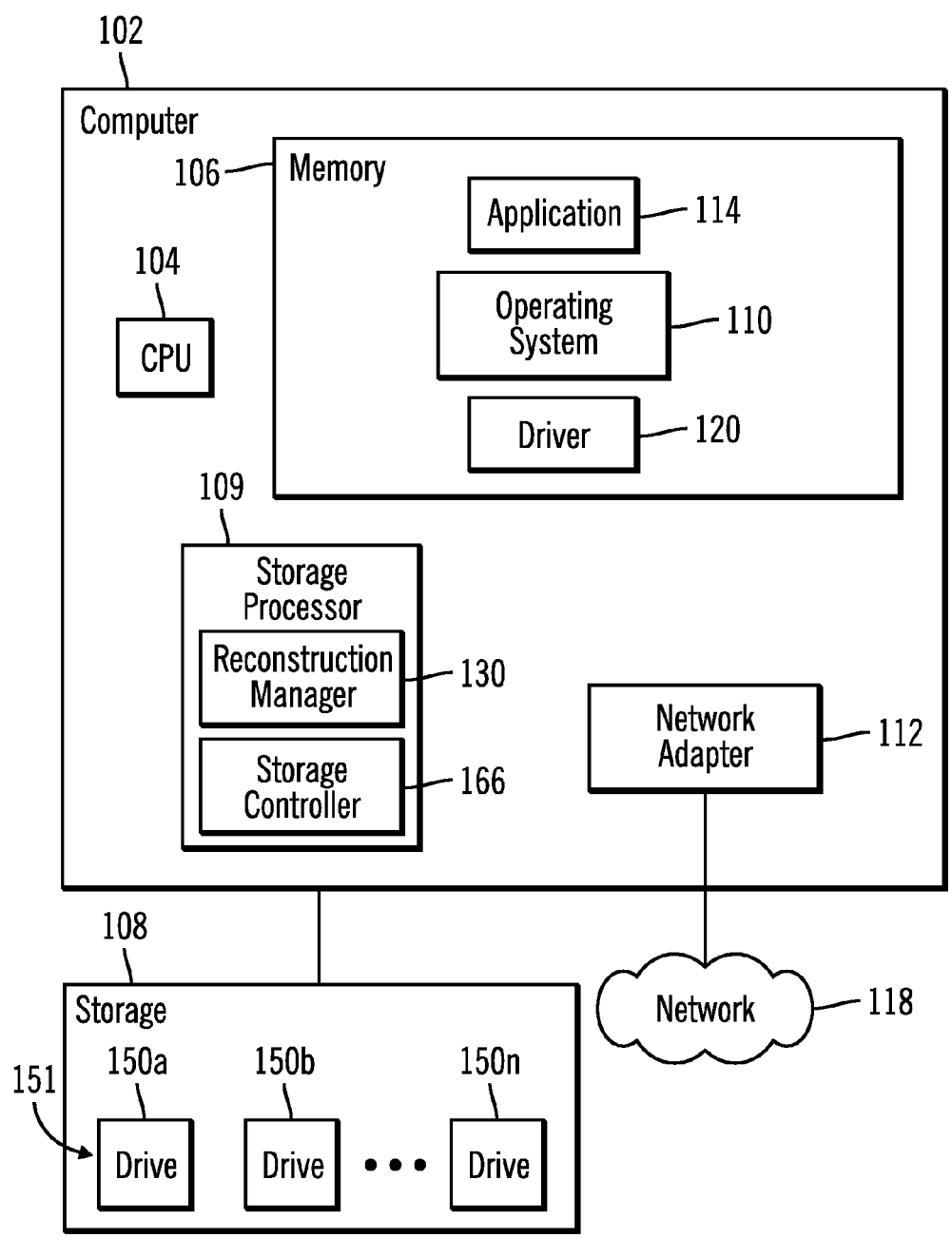
FIG. 4 illustrates one embodiment of a computing environment in which data construction aspects are implemented.

FIG. 4 illustrates a computing environment in which data construction aspects may be implemented. A computer 102 includes one or more central processing units (CPU) 104 (only one is shown), a memory 106, non-volatile storage 108, a storage processor 109, an operating system 110, and a network adapter 112. An application program 114 further executes in memory 106 and is capable of reading data from and writing data to the storage 108. The computer 102 may comprise any computing device known in the art, such as a mainframe, server, personal computer, workstation, laptop, handheld computer, telephony device, network appliance, virtualization device, storage processor, storage controller, etc. Any CPU 104 and operating system 110 known in the art may be used. Programs and data in memory 106 may be swapped into storage 108 as part of memory management operations. The computer 102 can communicate with a network 118 through the network adapter 112.

A device driver 120 executes in memory 106 and includes storage processor specific commands to communicate with the storage processor 109 and interface between the operating system 110 and the storage processor 109. The storage 108 includes a plurality of storage units, that is, disk drives 150a, 150b . . . 150n, for example, in which data may be stored in an organization type which permits the reconstruction of data. In the illustrated embodiment, the disk drives 150a, 150b . . . 150n are organized in a RAID array 151.

In certain implementations, the storage processor 109 performs certain functions to assist the computer 102 in reading data from or writing data to the storage 108. For example, the storage processor 109 may have software, firmware or hardware or combinations of these to translate Logical Block Addressing (LBA) addresses from the computer 102 to cylinder, head and sector specifications of the disk drives 150a, 150b . . . 150n. In addition, the storage processor 109 includes a data construction manager 130 which manages the reconstruction of data in the event of drive failure or other data loss. In addition, the construction manager 130 can manage the construction of new parity data when updating old data with new data.

Figure 5:
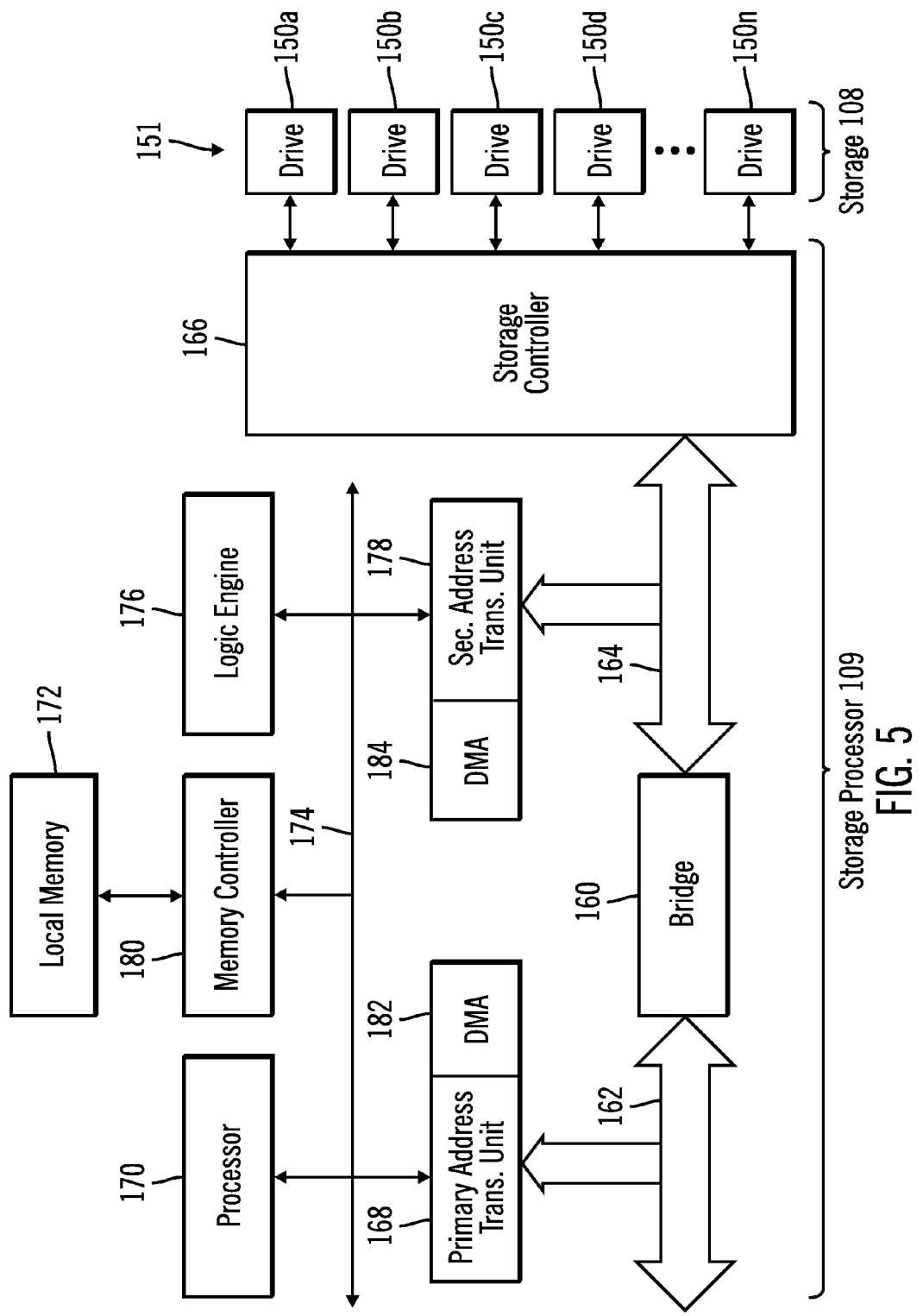
FIG. 5 illustrates one embodiment of a storage processor environment in which data construction aspects are implemented.

An example of a suitable storage processor 109 is illustrated in FIG. 5. The storage processor 109 facilitates rapid movement of large amounts of data between the host computer 102 and the storage 108. The storage processor 109 includes a bridge 160 between a primary bus 162 of the host computer 102 and a secondary bus 164 coupled to a storage controller 166 of the storage 108. The bridge 160 permits the storage controller 166 which may be a Serial Advanced Technology Attachment (SATA) controller for example, to be physically isolated from the primary bus 162. The controller 166 may also convert computer information to the storage interface which connects the storage processor 109 to the storage 108. Although the storage controller 166 is shown as part of the storage processor 109, the storage controller 166 may be part of the storage 108 or a separate unit.

A primary address translation unit 168 provides a high throughput data path from the primary bus 162 to a processor unit 170 and a local memory 172 via a local bus 174. Also coupled to the local bus 174 is a logic engine 176 which provides Exclusive-OR calculations to generate parity blocks for RAID algorithms. A secondary address translation unit 178 provides a high throughput data path from the processor unit 170 and local memory 172 to the secondary bus 164. In the illustrated embodiment, the busses 162, 164 are PCI busses but other types of peripheral busses may be used as well.

The local memory 172 has a memory controller 180. In the illustrated embodiment, the local memory 172 is volatile RAM type memory and is used to cache data being transferred to or received from the disk drives 150a, 150b . . . 150e. Other types of memory may be used as well. For example, non-volatile flash memory may be used to store recovery information identifying incomplete stripes in the event of an unexpected shut down of the storage processor 109 or the storage 108 during data transfer. Direct Memory Access (DMA) controllers 182, 184 permit direct memory transfers from the host computer 102 to the local memory 172 and from the local memory 172 to the drives 150a . . . 150n.

As previously mentioned, some RAID data reconstruction processes utilize at least eight read operations to reconstruct a block of data for a stripe having five blocks of data including a parity block. In accordance with one aspect of the illustrated embodiments, the construction manager 130 includes a logic engine 176 of a storage processor 109 which can, in some applications, significantly facilitate efficient reconstruction of lost data or construction of new parity data in a data update. For example, in one application, the number of read operations to reconstruct a block of data for a stripe having five blocks of data including a parity block, can be reduced to four read operations. Still further, the number of write operations to store the reconstructed block can be reduced from two write operations to one write operation.

Figure 6:
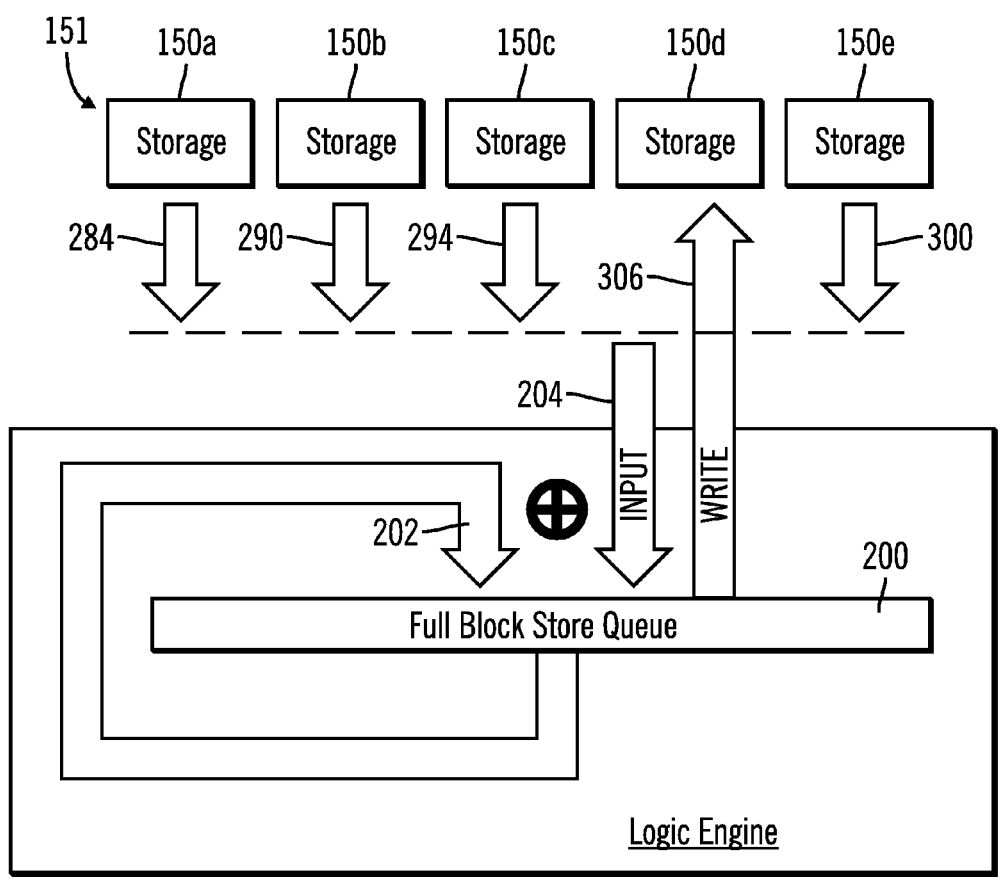
FIG. 6 illustrates one embodiment of a logic engine for the storage processor of FIG. 5 in accordance with data construction aspects.

FIG. 6 shows in schematic form, one example of the logic engine 176 which includes a store queue 200. The store queue 200 can perform an Exclusive-OR logical function on the contents of the store queue 200 as represented by an arrow 202 and the data being presented at its input as represented by an arrow 204. In accordance with one aspect of the illustrated embodiments, data may be read directly from one of the disk drives 150a, 150b . . . 150n and processed in the logic engine 176 in one read operation without first being cached in the local memory 172. In accordance with another aspect of the illustrated embodiment, the store queue 200 can accommodate a full block of data at a time. As explained in greater detail, one or more of these and other features can facilitate data construction including data reconstruction.

In the illustrated embodiment, the logic engine 176 is shown comprising a store queue. Other types of circuits may be used including registers and other types of logic and memory.

Figure 7:
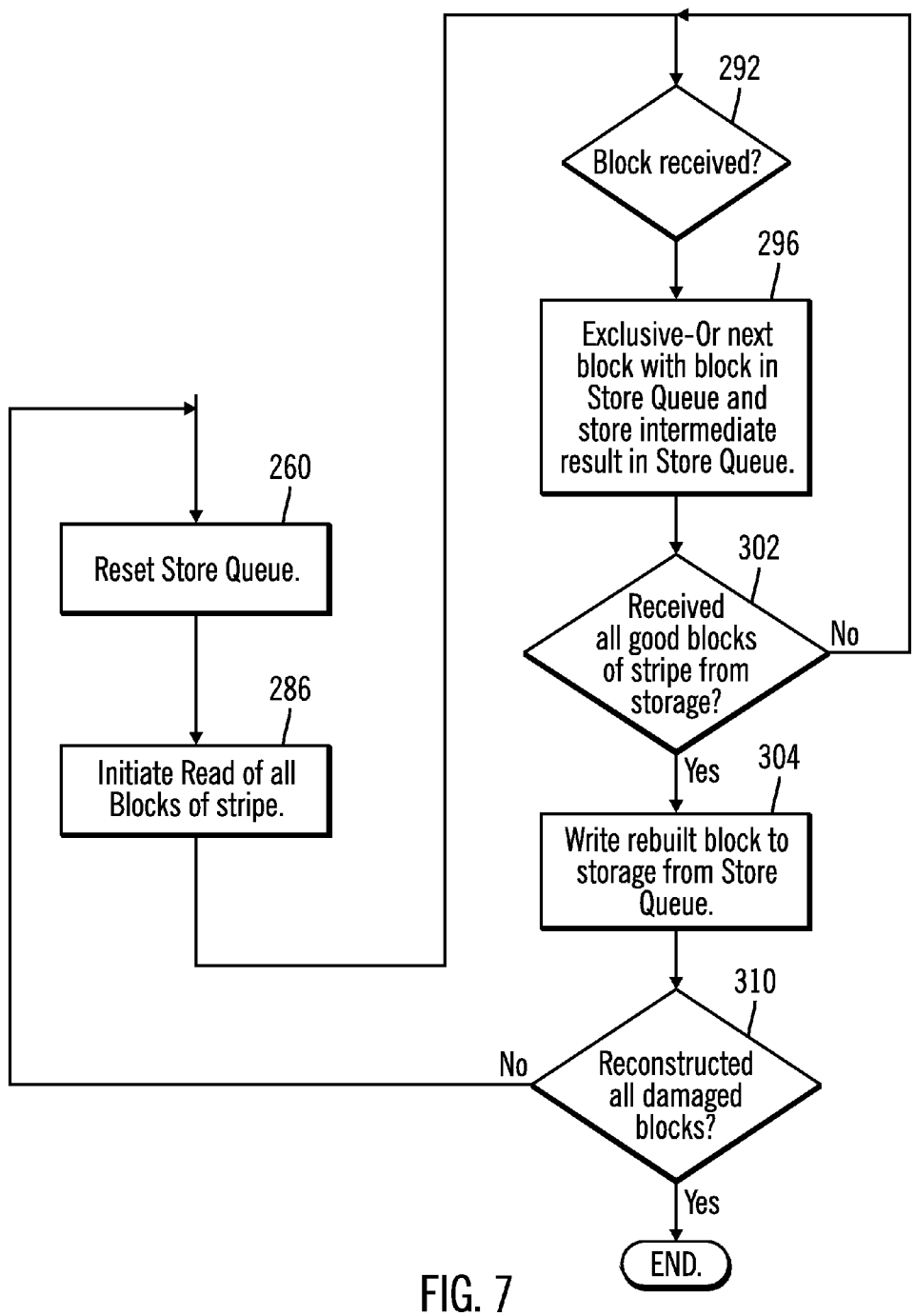
FIG. 7 illustrates one embodiment of operations performed to reconstruct data.

FIG. 7 illustrates one example of operations of the data construction manager 130 which includes the processor unit 170 and logic engine 176, in the reconstruction of data. In this example, a stripe n (FIG. 8) of data comprising five blocks of data including one parity block, is stored across five disk drives 150a, 150b, 150c, 150d and 150e, respectively, in which each block of data of the stripe is stored on one of the disk drives 150a, 150b . . . 150e. Also, one of the disk drives 150a, 150b . . . 150e, in this example, disk drive 150d, has failed such that the blocks of data of each stripe have been lost or otherwise corrupted and need to be reconstructed.

Figure 8:
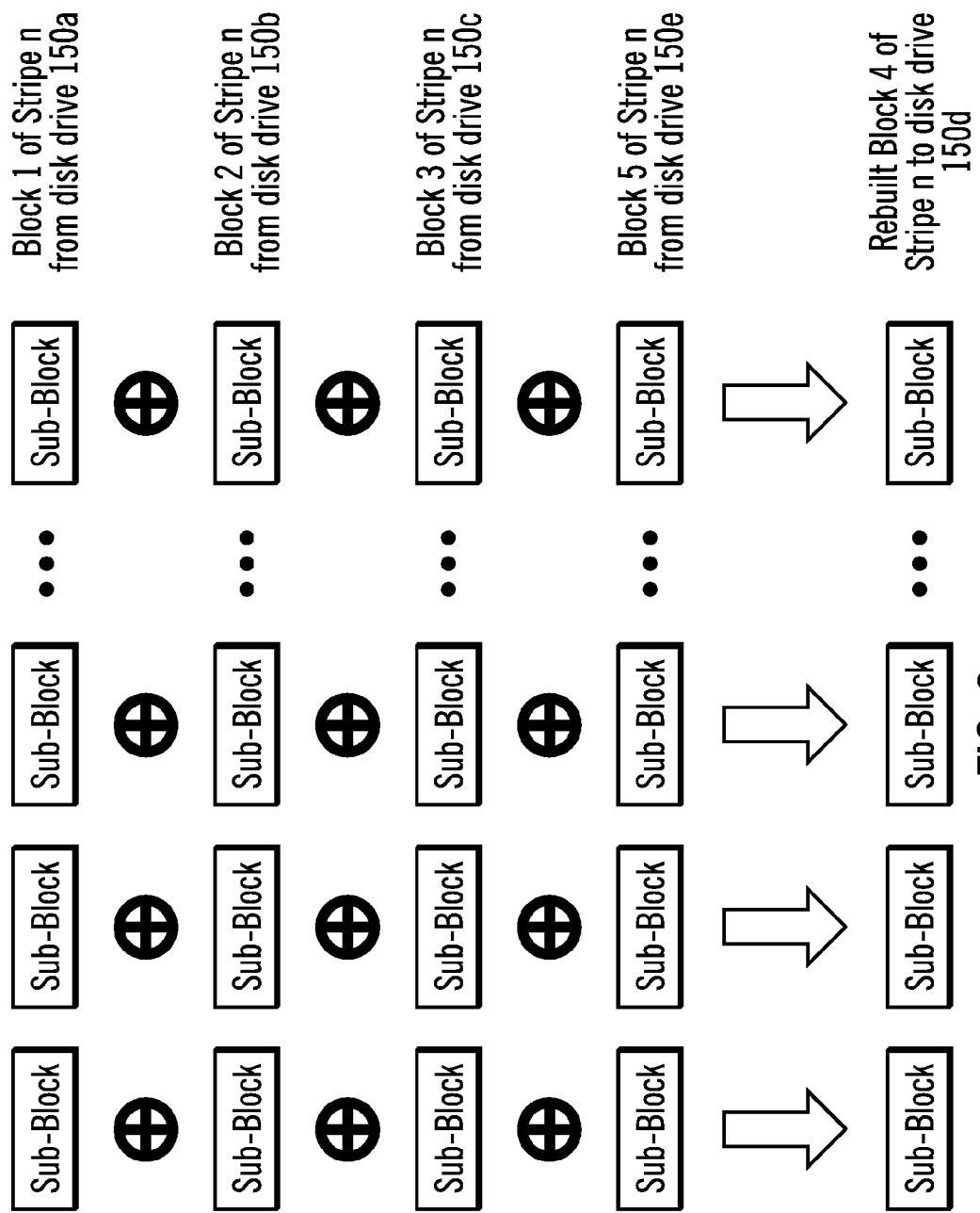
FIG. 8 illustrates blocks of data being used to reconstruct a block of data.

Upon resetting (process block 260) the store queue 200, read operations may be initiated (process block 286) for all the blocks of a particular stripe. In accordance with one aspect, all the blocks or subblocks may be read from the storage 108 and processed as described below in parallel. Thus, read commands can be issued by the storage processor 109 to all the disk drives 150a, 150b . . . 150e at the same time to read the corresponding blocks of a stripe. Once a block (or subblock) is received (process block 292) from one of the disk drives disk drives 150a, 150b . . . 150e in response to the read commands issued to the disk drives, the block may be stored in the store queue 200 (FIG. 6). This data may be for example, block 1 of a stripe n of data as shown in FIG. 8 if the disk drive containing block 1 is the first to respond to the issued read commands. Since the store queue 200 was previously reset, the block 1 of data which was read from the drive 150a, for example, may be stored in the store queue 200 by performing an Exclusive-OR function (block 296) with the block 1 data read from the drive 150a and the reset contents of the store queue 200. In the illustrated embodiment, the capacity of the store queue 200 is sufficient to accommodate a full block of data from a disk drive stripe. Thus, if, for example, the capacity of the store queue 200 is 64 K bytes, the read operation for each block can continue until the store queue 200 is filled with the entire 64 K bytes of the block 1 data. It is appreciated that the size the store queue 200 can vary, depending upon the application.

In response to the read commands previously issued (process block 286), another block of data from the stripe n, such as block 2 (FIG. 8), can be received (process block 292). The block 2 of data from the drive 150b is Exclusive-OR'ed (process block 296) with the block 1 of data previously stored in the store queue 200, and stored as an intermediate result in the store queue 200.

In response to the read commands previously issued (process block 286), another block of data from the stripe n, such as block 3 (FIG. 8), can be received (process block 292). The block 3 of data from the drive 150c is Exclusive-OR'ed (process block 296) with the contents of the store queue 200, and stored as an intermediate result in the store queue 200.

In response to the read commands previously issued (process block 286), another block of data from the stripe n, such as block 5 (FIG. 8), can be received (process block 292). The block 5 of (parity) data from the drive 150e is Exclusive-OR'ed (process block 296) with the contents of the store queue 200, and stored as an intermediate result in the store queue 200.

Once all of the good blocks of data of the stripe n have been received (process block 302) from the disk drives 150a, 150b . . . 150e, the intermediate result stored in the store queue 200 is the rebuilt block 4 (FIG. 8) of stripe n which may be written (process block 304) to the disk drive 150d in a first write operation 306 to replace the lost block 4 of the stripe n. The process of FIG. 7 may be repeated for each for each stripe of the array 151 of the disk drives 150a, 150b . . . 150e until each damaged block (process block 310) has been reconstructed.

Although process block 292 of FIG. 7 refers to reception of a "block," it should be appreciated that the subblocks of a block of the stripe n need not be received and processed together. Instead, subblocks may be received at different times and Exclusive-OR'd with the contents of the store queue 200 as received. Hence, the subblocks of each block of the stripe n may be intermingled with the subblocks of other blocks of the stripe N as they are received and processed by the store queue 200. Thus, the storage processor 109 can issue read commands to each of the disk drives 150a, 150b . . . 150e at the same time and the disk drives can respond with the requested data at the same time such that the subblocks of the various blocks of the stripe n can be intermingled together as they transfer over the bus 164 from the disk drives to the storage processor 109 and the store queue 200.

Figure 9:
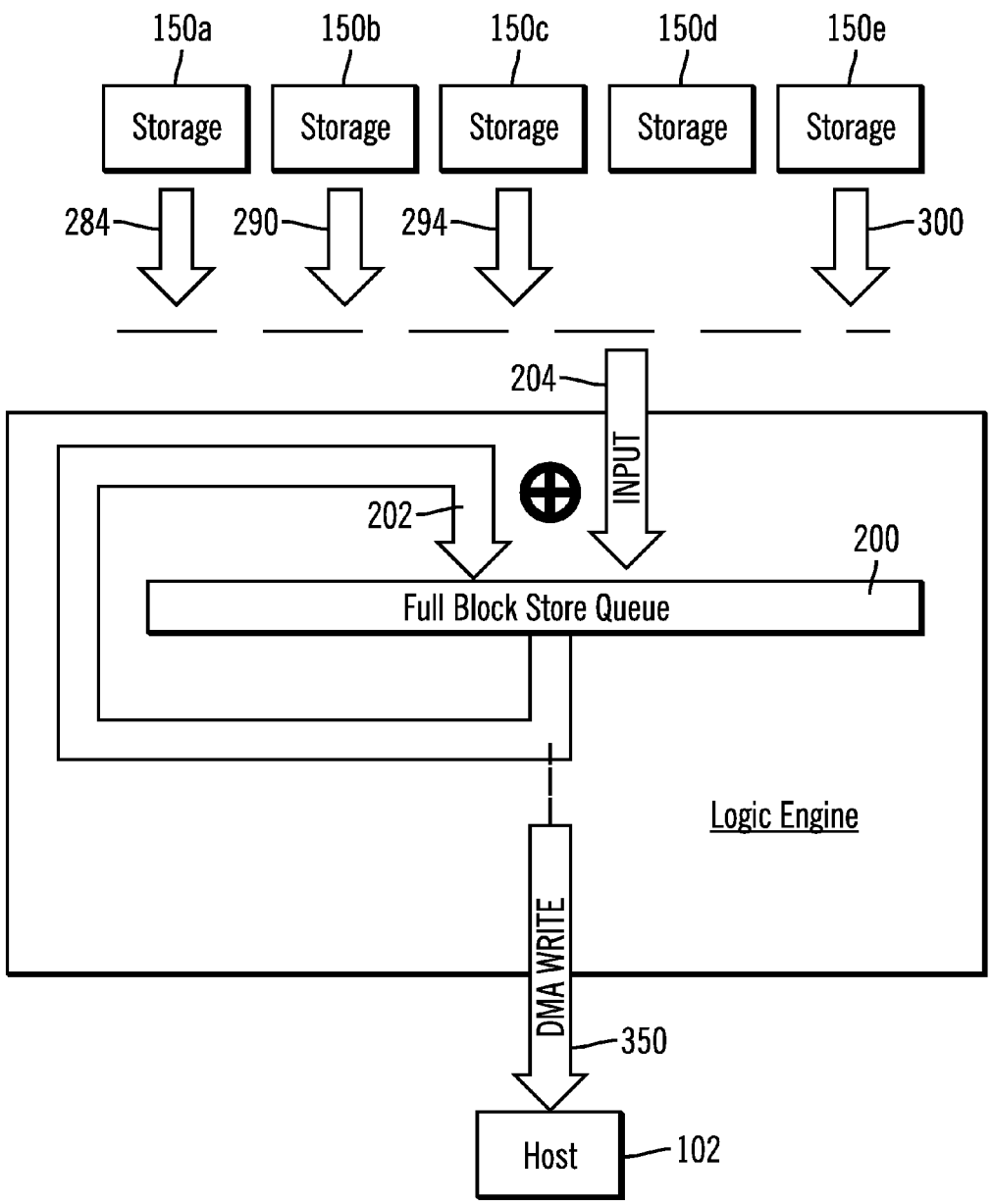
FIG. 9 illustrates another embodiment of operations performed to reconstruct data.

FIG. 9 illustrates another embodiment of operations of the construction manager 130 in which reconstructed data may be written directly from the store queue 200 to the host 102 such as to the host memory 106 in a degraded data read operation. In this embodiment, the construction manager 130 includes a DMA function in the storage processor 109 which permits a direct memory transfer of the reconstructed data from the store queue 200 to the host memory 106, for example, in a DMA write operation 350. The DMA controller may be for example, the DMA controller 182 of FIG.

5 or may be implemented within the circuitry of the logic engine 176 or elsewhere, depending upon the application.

Figure 10:
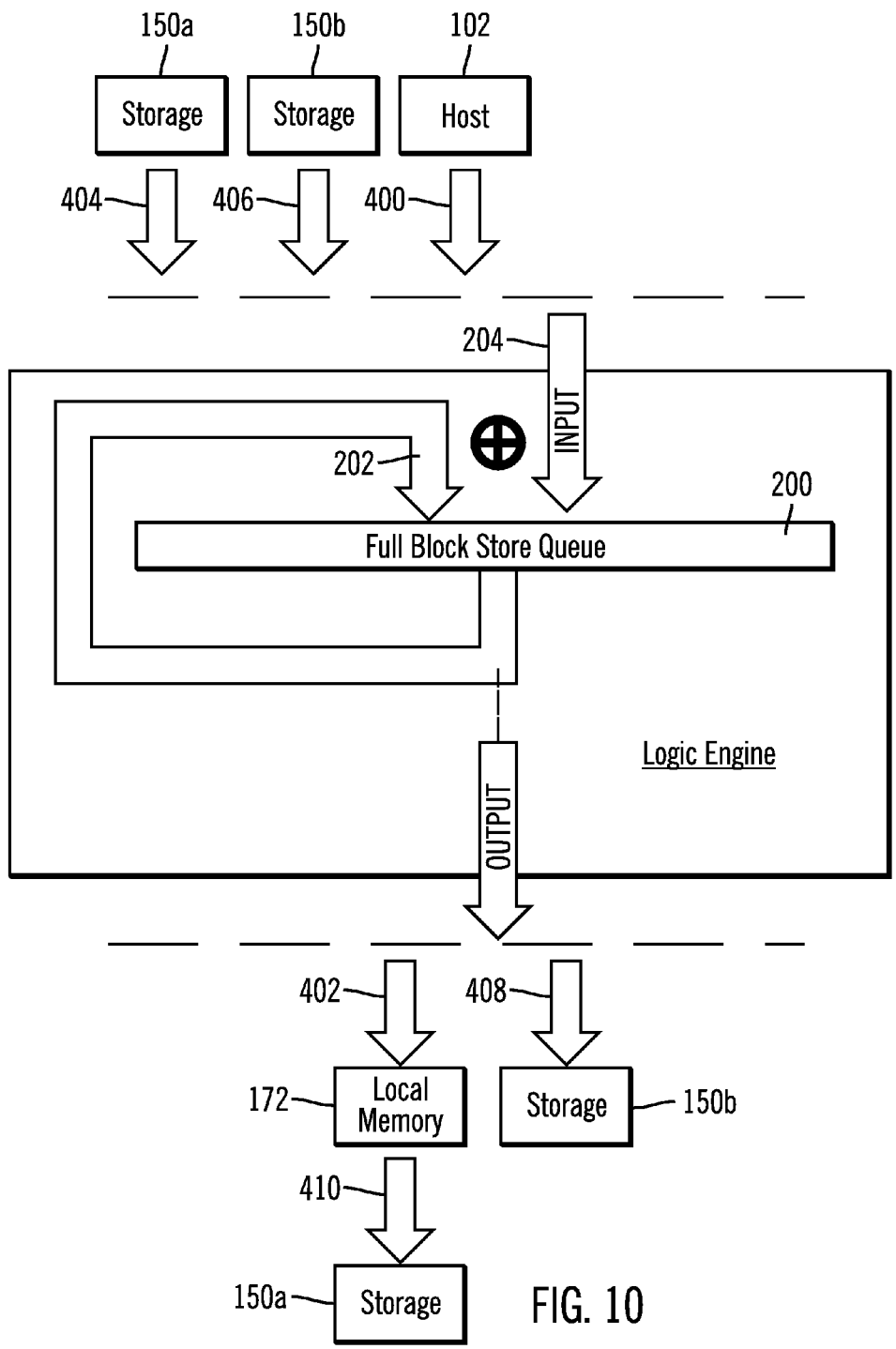
FIG. 10 illustrates another embodiment of operations performed to construct parity data.

FIG. 10 illustrates another embodiment of operations of the construction manager 130 in which new parity data is constructed to replace old parity data when updating old data with new data. Upon resetting the store queue 200, a block of the new data for a stripe n may be read from the host 102 and stored in the store queue 200 in a first read operation 400. This data transfer may be accomplished as a DMA transfer in one embodiment as discussed above. The new data may also be transferred from the store queue 200 to the local memory 172 in a first write operation 402. The old data may be transferred from a disk drive such as the disk drive 150a in second read operation 404. The block of old data from the drive 150a is Exclusive-OR'ed with the block of new data previously stored in the store queue 200, and stored as an intermediate result in the store queue 200.

The next block, that is, the block of old parity data of the stripe n, may be read from a disk drive such as the disk drive 150b in a third read operation 406. The block of old parity data from the drive 150b is Exclusive-OR'ed with the contents of the store queue 200, and stored as an intermediate result in the store queue 200.

Once the blocks of old data and old parity data of the stripe n and the block of new data for the stripe n have been received from the disk drives 150a, 150b and the host 102, respectively, the intermediate result stored in the store queue 200 is the block of new parity data for the stripe n which may be written to the disk drive 150b in a second write operation 408 to replace the old parity data for the stripe n. In addition, the new data may be written from the local memory 172 to the disk drive 150a to replace the old data in a third write operation 410. It is appreciated that the number of read and write operations in a data update operation can be significantly reduced as described above.

Again, in accordance with another aspect, all the blocks or subblocks may be read from the storage 108 and the host memory 106 and processed in parallel. Thus, read commands can be issued by the storage processor 109 to the host memory and to all the disk drives 150a, 150b . . . 150e at the same time to read the corresponding blocks of a stripe.

Additional Embodiment Details

The described techniques for managing data construction may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration, and that the article of manufacture may comprise any information bearing medium known in the art.

Although the logic engine is described as having one store queue or register for performing Exclusive-OR operations, it is appreciated that the logic engine may have a plurality of store queues or registers, particularly for data organizations having plural parity blocks, as described in copending application entitled, "METHOD, SYSTEM, AND PROGRAM FOR GENERATING PARITY DATA" assigned to the assignee of the present application, filed Dec. 29, 2003.

In certain implementations, the storage processor 109 includes data construction manager 130 which manages the construction and reconstruction of data. The storage processor 109 may have software, firmware or hardware or combinations of these to perform these and other functions. For example, in one embodiment, the processor 170 and the logic engine 176 may be implemented in hardware in a storage processor 109 separate from the host processor. In other implementations, the data construction manager may be implemented in host software including drivers, an operating system or an application, or combinations of these.

In certain implementations, a computer system may include a driver and a storage controller, such as Serial-Advanced Technology Attachment (SATA), Serial Attached SCSI (SAS), Redundant Array of Independent Disk (RAID), etc., controller, that manages access to a non-volatile storage device, such as a magnetic disk drive, tape media, optical disk, etc. In alternative implementations, the storage controller embodiments may be included in a system that does rot include a driver. Further details on the SAS architecture for devices and expanders is described in the technology specification "Information Technology—Serial Attached SCSI (SAS)", reference no. ISO/IEC 14776-150:200x and ANSI INCITS.***:200x PHY layer (Jul. 9, 2003), published by ANSI. Details on the SATA architecture are described in the technology specification "Serial ATA: High Speed Serialized AT Attachment" Rev. 1.0A (January 2003).

Although the logic engine is described as receiving and processing a full block of data, it is appreciated that a portion of a block or multiple blocks may be received and processed at a time. In addition, although the logic engine is described as receiving data directly from a non-volatile storage unit such as a disk drive, it is appreciated that in some embodiments, data can be transferred to the logic engine from volatile memory such as RAM memory.

In certain implementations, the device driver and storage processor embodiments may be implemented in a computer system including a video controller to render information to display on a monitor coupled to the computer system including the device driver and network adapter, such as a computer system comprising a desktop, workstation, server, mainframe, laptop, handheld computer, etc. Alternatively, the storage processor and device driver embodiments may be implemented in a computing device that does not include a video controller.

In certain implementations, the network adapter may be configured to transmit data across a cable connected to a port on the network adapter. Alternatively, the network adapter embodiments may be configured to transmit data over a wireless network or connection, such as wireless LAN, Bluetooth, etc.

The illustrated logic of FIG. 7 slows certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

Figure 11:
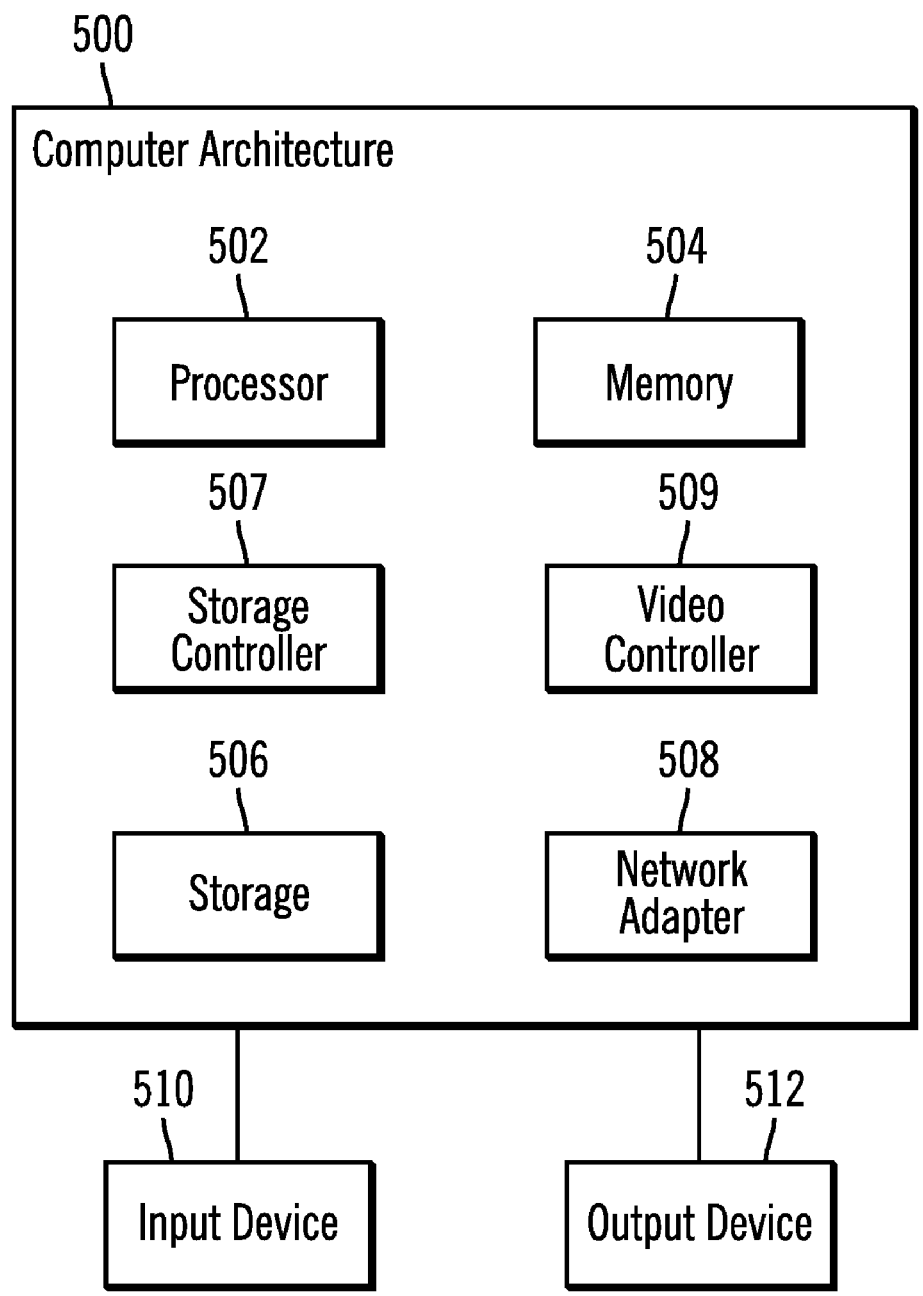
FIG. 11 illustrates an architecture that may be used with the described embodiments.

FIG. 11 illustrates one implementation of a computer architecture 500 of the network components, such as the hosts and storage devices shown in FIG. 4. The architecture 500 may include a processor 502 (e.g., a microprocessor), a memory 504 (e.g., a volatile memory device), and storage 506 (e.g., a non-volatile storage, such as magnetic disk drives, optical disk drives, a tape drive, etc.). The storage 506 may comprise an internal storage device or an attached or network accessible storage. Programs in the storage 506 are loaded into the memory 504 and executed by the processor 502 in a manner known in the art. A storage processor 507 can control the storage 506. The architecture further includes a network adapter 508 to enable communication with a network, such as an Ethernet, a Fibre Channel Arbitrated Loop, etc. Details on the Fibre Channel architecture are described in the technology specification "Fibre Channel Framing and Signaling Interface", document no. ISO/IEC AWI 14165-25.

Further, the architecture may, in certain embodiments, include a video controller 509 to render information on a display monitor, where the video controller 509 may be implemented on a video card or integrated on integrated circuit components mounted on the motherboard. As discussed, certain of the network devices may have multiple storage cards or controllers. An input device 510 is used to provide user input to the processor 502, and may include a keyboard, mouse, pen-stylus, microphone, touch sensitive display screen, or any other activation or input mechanism known in the art. An output device 512 is capable of rendering information transmitted from the processor 502, or other component, such as a display monitor, printer, storage, etc.

The storage processor 506 and the network adapter 508 may each be implemented on cards, such as a Peripheral Component Interconnect (PCI) card or some other I/O card, or on integrated circuit components mounted on the motherboard. Details on the PCI architecture are described in "PCI Local Bus, Rev. 2.3", published by the PCI-SIG.

The foregoing description of various embodiments has been presented for the purposes of illustration and description. The above specification, examples and data provide a complete description of the manufacture and use of the composition. It is not intended to be exhaustive or to limit to the precise form disclosed. Many modifications and variations are possible in light of the above teaching.

What is claimed is:

1. A method, comprising:
    transferring from a first non-volatile storage unit of a plurality of non-volatile storage units, to a logic engine of a storage processor having a cache memory, a first unit of data stored in a stripe across said plurality of non-volatile storage units, in a first transfer operation which bypasses said cache memory;
    transferring from a second non-volatile storage unit of said plurality of non-volatile storage units, to said logic engine, a second unit of data stored in said stripe, in a second transfer operation which bypasses said cache memory; and
    constructing in said logic engine a third unit of data using said first unit of data transferred to said logic engine in said first transfer operation and using said second unit of data transferred to said logic engine in said second transfer operation.

2. The method of claim 1 further comprising transferring said constructed third unit of data to a third non-volatile storage unit of said plurality of non-volatile storage units in a third transfer operation, and storing said constructed third unit of data in said stripe.

3. The method of claim 2 wherein said third transfer operation bypasses said cache memory.

4. The method of claim 2 wherein said plurality of non-volatile storage units are arranged in a Redundant Array of Independent Disks organization.

5. The method of claim 4 wherein said second unit of data is parity data.

6. The method of claim 5 wherein each non-volatile storage unit is a disk drive.

7. The method of claim 6 wherein said stripe is organized as a Redundant Array of Independent Disks stripe of blocks of data including a block of parity data and each of said units of data is a block of data of said Redundant Array of Independent Disks stripe.

8. The method of claim 7 wherein said logic engine includes a store queue capable of storing a block of data from said Redundant Array of Independent Disks stripe.

9. The method of claim 1 wherein said cache memory of said logic engine is a random access memory.

10. The method of claim 1 wherein said constructing in said logic engine a third unit of data includes applying said first unit of data transferred to said logic engine in said first transfer operation, to a store queue of said logic engine and performing an exclusive-OR logic function operation on the contents of said first store queue and said applied first unit of data, and includes applying said second unit of data transferred to said logic engine in said second transfer operation, to said store queue of said logic engine and performing an exclusive-OR logic function operation on the contents of said store queue and said applied second unit of data.

11. The method of claim 2 further comprising:
    transferring from a fourth non-volatile storage unit of said plurality of non-volatile storage units, to said logic engine, a fourth unit of data stored in said stripe, in a fourth transfer operation which bypasses said cache memory; and
    transferring from a fifth non-volatile storage unit of said plurality of non-volatile storage units, to said logic engine, a fifth unit of data stored in said stripe, in a fifth transfer operation which bypasses said cache memory; and
    wherein said constructing in said logic engine said third unit of data also uses said fourth unit of data transferred to said logic engine in said fourth transfer operation and using said fifth unit of data transferred to said logic engine in said fifth transfer operation prior to said transferring said constructed third unit of data to said third non-volatile storage unit in said third transfer operation.

12. The method of claim 2 further comprising:
    for each additional non-volatile storage unit of said plurality of storage units:
        transferring from an additional non-volatile storage unit of said plurality of non-volatile storage units, to said logic engine, an additional unit of data stored in said stripe, in an additional transfer operation which bypasses said cache memory; and wherein said constructing in said logic engine said third unit of data also uses said additional unit of data transferred to said logic engine in said additional transfer operation prior to said transferring said constructed third unit of data to said third non-volatile storage unit in said third transfer operation.

13. The method of claim 1 further comprising:
transferring to said logic engine, a fourth unit of data which is new data to be stored in said stripe; wherein said first unit of data is old data to be replaced by said new data in said stripe, said second unit of data is old parity data to be replaced in said stripe and wherein said constructing in said logic engine said third unit of data constructs a replacement unit of parity data using said new data transferred to said logic engine, said method further comprising transferring said third unit of new parity data to said second non-volatile storage unit to replace said second unit of old parity data.

14. The method of claim 1 further comprising transferring said constructed third unit of data to a host in a third transfer operation.

15. The method of claim 1 wherein the storage processor issues read commands to said first and second non-volatile storage units so that said first and second units of data are accessed from said first and second non-volatile storage units at least partially in parallel.

16. An article of manufacture comprising a device having a storage medium, the storage medium comprising machine readable instructions stored thereon to:
transfer from a first non-volatile storage unit of a plurality of non-volatile storage units, to a logic engine of a storage processor having a cache memory, a first unit of data stored in a stripe across said plurality of non-volatile storage units, in a first transfer operation which bypasses said cache memory;
transfer from a second non-volatile storage unit of said plurality of non-volatile storage units, to said logic engine, a second unit of data stored in said stripe, in a second transfer operation which bypasses said cache memory; and
construct in said logic engine a third unit of data using said first unit of data transferred to said logic engine in said first transfer operation and using said second unit of data transferred to said logic engine in said second transfer operation.

17. The article of claim 16 wherein the storage medium further comprises machine readable instructions stored thereon to transfer said constructed third unit of data to a third non-volatile storage unit of said plurality of non-volatile storage units in a third transfer operation, and store said constructed third unit of data in said stripe.

18. The article of claim 17 wherein said third transfer operation bypasses said cache memory.

19. The article of claim 17 wherein said plurality of non-volatile storage units are arranged in a Redundant Array of Independent Disks organization.

20. The article of claim 19 wherein said second unit of data is parity data.

21. The article of claim 20 wherein each non-volatile storage unit is a disk drive.

22. The article of claim 21 wherein said stripe is organized as a Redundant Array of Independent Disks stripe of blocks of data including a block of parity data and each of said units of data is a block of data of said Redundant Array of Independent Disks stripe.

23. The article of claim 22 wherein said logic engine includes a store queue capable of storing a block of data from said Redundant Array of Independent Disks stripe.

24. The article of claim 16 wherein said cache memory of said logic engine is a random access memory.

25. The article of claim 16 wherein the machine readable instructions to construct in said logic engine a third unit of data include machine readable instructions stored on the storage medium to apply said first unit of data transferred to said logic engine in said first transfer operation, to a store queue of said logic engine and perform an exclusive-OR logic function operation on the contents of said first store queue and said applied first unit of data, and to apply said second unit of data transferred to said logic engine in said second transfer operation, to said store queue of said logic engine and perform an exclusive-OR logic function operation on the contents of said store queue and said applied second unit of data.

26. The article of claim 17 wherein the storage medium further comprises machine readable instructions stored thereon to:
transfer from a fourth non-volatile storage unit of said plurality of non-volatile storage units, to said logic engine, a fourth unit of data stored in said stripe, in a fourth transfer operation which bypasses said cache memory; and
transfer from a fifth non-volatile storage unit of said plurality of non-volatile storage units, to said logic engine, a fifth unit of data stored in said stripe, in a fifth transfer operation which bypasses said cache memory; and
wherein the machine readable instructions to construct in said logic engine a third unit of data include machine readable instructions stored on the storage medium to use said fourth unit of data transferred to said logic engine in said fourth transfer operation and to use said fifth unit of data transferred to said logic engine in said fifth transfer operation prior to said transferring said constructed third unit of data to said third non-volatile storage unit in said third transfer operation.

27. The article of claim 16 wherein the storage medium further comprises machine readable instructions stored thereon to:
transfer to said logic engine, a fourth unit of data which is new data to be stored in said stripe; wherein said first unit of data is old data to be replaced by said new data in said stripe, said second unit of data is old parity data to be replaced in said stripe and wherein the machine readable instructions to construct in said logic engine a third unit of data include machine readable instructions stored on the storage medium to construct a replacement unit of parity data using said new data transferred to said logic engine, said wherein the storage medium further comprises machine readable instructions stored thereon to transfer said third unit of new parity data to said second non-volatile storage unit to replace said second unit of old parity data.

28. The article of claim 16 wherein the storage medium further comprises machine readable instructions stored thereon to transfer said constructed third unit of data to a host in a third transfer operation.

29. The article of claim 16 wherein the storage medium further comprises machine readable instructions stored thereon to issue read commands to said first and second non-volatile storage units so that said first and second units of data are accessed from said first and second non-volatile storage units at least partially in parallel.

30. A system, comprising:
at least one memory which includes an operating system and an application;
a processor coupled to the memory;
data storage having a plurality of non-volatile storage units;
a data storage processor adapted to manage Input/Output (I/O) access to the data storage and having a cache memory and a logic engine; and
a device driver executable by the processor in the memory, wherein at least one of the application, operating system, device driver and the storage processor is adapted to:
transfer from a first non-volatile storage unit to said logic engine of said storage processor, a first unit of data stored in a stripe across said plurality of non-volatile storage units, in a first transfer operation which bypasses said cache memory;
transfer from a second non-volatile storage unit of said plurality of non-volatile storage units, to said logic engine, a second unit of data stored in said stripe, in a second transfer operation which bypasses said cache memory; and
construct in said logic engine a third unit of data using said first unit of data transferred to said logic engine in said first transfer operation and using said second unit of data transferred to said logic engine in said second transfer operation.

31. The system of claim 30 wherein said at least one of the application, operating system, device driver and the storage processor is further adapted to transfer said constructed third unit of data to a third non-volatile storage unit of said plurality of non-volatile storage units in a third transfer operation, and store said constructed third unit of data in said stripe.

32. The system of claim 31 wherein said third transfer operation bypasses said cache memory.

33. The system of claim 31 wherein said plurality of non-volatile storage units are arranged in a Redundant Array of Independent Disks organization.

34. The system of claim 33 wherein said second unit of data is parity data.

35. The system of claim 34 wherein each non-volatile storage unit is a disk drive.

36. The system of claim 35 wherein said stripe is organized as a Redundant Array of Independent Disks stripe of blocks of data including a block of parity data and each of said units of data is a block of data of said Redundant Array of Independent Disks stripe.

37. The system of claim 36 wherein said logic engine includes a store queue capable of storing a block of data from said Redundant Array of Independent Disks stripe.

38. The system of claim 30 wherein said cache memory of said logic engine is a random access memory.

39. The system of claim 30 wherein to construct in said logic engine a third unit of data, said at least one of the application, operating system, device driver and the storage processor is further adapted to apply said first unit of data transferred to said logic engine in said first transfer operation, to a store queue of said logic engine and perform an exclusive-OR logic function operation on the contents of said first store queue and said applied first unit of data, and to apply said second unit of data transferred to said logic engine in said second transfer operation, to said store queue of said logic engine and perform an exclusive-OR logic function operation on the contents of said store queue and said applied second unit of data.

40. The system of claim 31 wherein said at least one of the application, operating system, device driver and the storage processor is farther adapted to transfer from a fourth non-volatile storage unit of said plurality of non-volatile storage units, to said logic engine, a fourth unit of data stored in said stripe, in a fourth transfer operation which bypasses said cache memory; and
transfer from a fifth non-volatile storage unit of said plurality of non-volatile storage units, to said logic engine, a fifth unit of data stored in said stripe, in a fifth transfer operation which bypasses said cache memory; and
wherein to construct in said logic engine a third unit of data, said at least one of the application, operating system, device driver and the storage processor is farther adapted to use said fourth unit of data transferred to said logic engine in said fourth transfer operation and to use said fifth unit of data transferred to said logic engine in said fifth transfer operation prior to said transferring said constructed third unit of data to said third non-volatile storage unit in said third transfer operation.

41. The system of claim 30 wherein said at least one of the application, operating system, device driver and the storage processor is further adapted to transfer to said logic engine, a fourth unit of data which is new data to be stored in said stripe; wherein said first unit of data is old data to be replaced by said new data in said stripe, said second unit of data is old parity data to be replaced in said stripe and wherein the machine readable instructions to construct in said logic engine a third unit of data include machine readable instructions stored on the storage medium to construct a replacement unit of parity data using said new data transferred to said logic engine, said wherein the storage medium further comprises machine readable instructions stored thereon to transfer said third unit of new parity data to said second non-volatile storage unit to replace said second unit of old parity data.

42. The system of claim 30 wherein said at least one of the application, operating system, device driver and the storage processor is further adapted to transfer said constructed third unit of data to a host in a third transfer operation.

43. The system of claim 30 wherein said at least one of the application, operating system, device driver and the storage processor is further adapted to issue read commands to said first and second non-volatile storage units so that said first and second units of data are accessed from said first and second non-volatile storage units at least partially in parallel.

44. A device for use with a data storage having a plurality of non-volatile storage units, comprising:
a data storage processor adapted to manage Input/Output (I/O) access to the data storage and having a cache memory and a logic engine, wherein the storage processor is further adapted to:
transfer from a first non-volatile storage unit to said logic engine of said storage processor, a first unit of data stored in a stripe across said plurality of non-volatile storage units, in a first transfer operation which bypasses said cache memory;
transfer from a second non-volatile storage unit of said plurality of non-volatile storage units, to said logic engine, a second unit of data stored in said stripe, in a second transfer operation which bypasses said cache memory; and
construct in said logic engine a third unit of data using said first unit of data transferred to said logic engine in said first transfer operation and using said second unit of data transferred to said logic engine in said second transfer operation.

45. The device of claim 44 wherein the device is further adapted to transfer said constructed third unit of data to a third non-volatile storage unit of said plurality of non-volatile storage units in a third transfer operation, and store said constructed third unit of data in said stripe.

46. The device of claim 45 wherein said third transfer operation bypasses said cache memory.

47. The device of claim 45 wherein each non-volatile storage unit is a disk drive, said plurality of non-volatile storage units are arranged in a Redundant Array of Independent Disks organization, said stripe is organized as a Redundant Array of Independent Disks stripe of blocks of data including a block of parity data and each of said units of data is a block of data of said Redundant Array of Independent Disks stripe.

48. The device of claim 47 wherein said logic engine includes a store queue capable of storing a block of data from said Redundant Array of Independent Disks stripe, said cache memory of said logic engine is a random access memory, and to construct in said logic engine a third unit of data, said storage processor is further adapted to apply said first unit of data transferred to said logic engine in said first transfer operation, to a store queue of said logic engine and perform an exclusive-OR logic function operation on the contents of said first store queue and said applied first unit of data, and to apply said second unit of data transferred to said logic engine in said second transfer operation, to said store queue of said logic engine and perform an exclusive-OR logic function operation on the contents of said store queue and said applied second unit of data.

49. The device of claim 44 wherein said storage processor is further adapted to transfer said constructed third unit of data to a host in a third transfer operation.

50. The device of claim 44 wherein said storage processor is further adapted to issue read commands to said first and second non-volatile storage units so that said first and second units of data are accessed from said first and second non-volatile storage units at least partially in parallel.

* * * * *